United States Patent Office 3,567,716
Patented Mar. 2, 1971

3,567,716
1,8-NAPHTHYRIDINE DERIVATIVES AND INTERMEDIATES THEREOF
Sadao Nishigaki, Tokyo, Takeo Naito, Ichikawa-shi, Yasuo Oshima, Tokyo, Renzo Dohmori, Chiba-gun, Senkichi Nagasaki, Chofu-shi, and Shizuo Kadoya and Isao Takamura, Tokyo, Japan, assignors to Daiichi Seiyaku Company, Limited, Tokyo, Japan
No Drawing. Filed May 31, 1967, Ser. No. 642,303
Claims priority, application Japan, June 14, 1966, 41/38,024; July 22, 1966, 41/47,638; Dec. 2, 1966, 41/78,658; Dec. 6, 1966, 41/79,554
Int. Cl. C07d *31/32, 31/28*
U.S. Cl. 260—240 25 Claims

ABSTRACT OF THE DISCLOSURE

These compounds, 1-substituted-1,4-dihydro-7-[2(5-nitro-2-furyl)vinyl]-4-oxo-1,8-naphthyridine-3 - carboxylic acids, are derivatives of 1,8-naphthyridine and are useful as antibacterial agents.

Lower-alkyl 4 - hydroxy-7-methyl-1,8-naphthyridine-3-carboxylate is reacted with 5-nitrofurfural to produce lower-alkyl 4 - hydroxy - 7-[2-(5-nitro-2-furyl)vinyl]-1,8-naphthyridine-3-carboxylate, then thus obtained product is hydrolyzed to produce 4-hydroxy-7-[2-(5-nitro-2-furyl)vinyl]-1,8-naphthyridine - 3 - carboxylic acid, and then various radicals are introduced into the 1-nitrogen atom of the 1,8-naphthyridine nucleus to produce 1-substituted-1,4-dihydro-7-[2-(5-nitro-2-furyl)vinyl] - 4 - oxo-1,8-naphthyridine-3-carboxylic acids.

---

The present invention relates to novel 1,8-naphthyridine derivatives and more particularly to 1-substituted-1,4-dihydro-7-[2-(5-nitro-2-furyl)vinyl]-4-oxo - 1,8 - naphthyridine-3-carboxylic acids, to intermediates useful in the preparation and to a method of preparing said compounds.

As a medicine of 1,8-naphthyridine series, there has been known nalidixic acid, 1-ethyl-1,4-dihydro-7-methyl-4-oxo-1,8-naphthyridine-3-carboxylic acid, which has excellent antibacterial activities against Gram-negative bacteria and has widely been used clinically [George Y. Lesher et al.: Journal of Medicinal and Pharmaceutical Chemistry, vol. 5, 1063 (1962)].

It has now been found that the novel compounds of the present invention, wherein 7-position of a 1,8-naphthyridine nucleus is substituted by a 2-(5-nitro-2-furyl)-vinyl radical, have a broader antibacterial spectrum than nalidixic acid, and are effective against both Gram-positive and Gram-negative bacteria, and moreover their antibacterial activities are stronger than those of nalidixic acid.

The novel compounds of the present invention can be represented by the following formula:

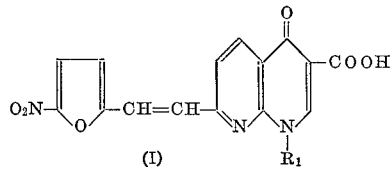

(I)

wherein $R_1$ is a lower-alkyl radical; a radical represented by the following formula:

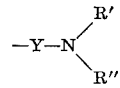

wherein R' and R" are the same or different and each represents a hydrogen atom or a lower-alkyl radical, and Y represents a lower-alkylene group; a carboxy-lower-alkyl radical; or a radical represented by the following formula:

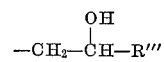

wherein R''' is a hydrogen atom or a lower-alkyl radical which can be substituted by a hydroxyl radical or a halogen atom.

As used hereinabove or hereinbelow the term "lower-alkyl" and "lower-alkylene each represents straight- or branched-chain saturated hydrocarbon group having from one to six carbon atoms inclusive.

As the radicals mentioned above, the following radicals may be cited. That is, the lower-alkyl radical includes, for example, methyl, ethyl, n-propyl and iso-propyl radicals; the radical represented by the formula:

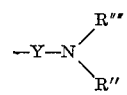

includes, for example, 2-aminoethyl, 2-ethylaminoethyl, 2-dimethylaminoethyl, 2-diethylaminoethyl, 3-dimethyl-amino-n-propyl, and 3-diethylamino-2-methyl-propyl radicals; the carboxy-lower-alkyl radical includes, for example, carboxymethyl and 1-carboxyethyl radicals; and the radical represented by the following formula:

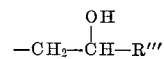

includes, for example, 2-hydroxyethyl, 2-hydroxypropyl, 2,3-dihydroxypropyl and 3-chloro-2-hydroxypropyl radicals.

The novel compounds of the present invention have excellent antibacterial activities and are useful as valuable medicines for combating diseases caused by pathogenic microorganisms.

The antibacterial activities of the novel compounds of the present invention were compared with those of nalidixic acid which shows excellent antibacterial activities against Gram-negative bacteria. The values shown in Table 1 represent the minimum inhibitory concentration (μg./ml.) of the compounds. These tests were carried out under cultivation at 37° C. for 48 hrs. using the semi-synthetic medium for *Shigella dysenteriae* or the Mueller Hinton medium.

TABLE 1

| Organism | Minimum inhibitory concentration, µg./m. l. | | | | | | |
|---|---|---|---|---|---|---|---|
| | A | B | C | D | E | F | G |
| (1) *Escherichia coli:* 0111 | 3.2 | <1.6 | <1.6 | <1.6 | <1.6 | <1.6 | <1.6 |
| (2) *Shigella dysenteriae:* Hanabusa | 1.6 | <1.6 | <1.6 | <1.6 | <1.6 | <1.6 | <1.6 |
| (3) *Salmonella typhi:* H901 | 1.6 | <1.6 | <1.6 | <1.6 | <1.6 | <1.6 | <1.6 |
| (4) *Staphylococcus aureus:* Terajima | 25 | <1.6 | <1.6 | <1.6 | <1.6 | <1.6 | <1.6 |
| (5) *Diplococcus pneumoniae:* DP-1 | 100 | <1.6 | <1.6 | <1.6 | <1.6 | <1.6 | <1.6 |
| (6) *Ersipelothirix rhusiopathiae:* Chiran | 50 | <1.6 | <1.6 | <1 6 | <1.6 | <1.6 | <1.6 |

NOTE:
A = nalidixic acid.
B = 1-ethyl-1,4-dihydro-7-[2-(5-nitro-2-furyl)vinyl]-4-oxo-1,8-naphthyridine-3-carboxylic acid.
C = 1-carboxymethyl-1,4-dihydro-7-[2-(5-nitro-2-furyl)vinyl]-4-oxo-1,8-naphthyridine-3-carboxylic acid
D = 1-(2-diethylaminoethyl)-1,4-dihydro-7-[2-(5-nitro-2-furyl)-vinyl]-4-oxo-1,8-naphthyridine-3-carboxylic acid.
E = 1,4-dihydro-1-(2-hydroxyethyl)-7-[2-(5-nitro-2-furyl)vinyl]-4-oxo-1,8-naphthyridine-3-carboxylic acid.
F = 1,4-dihydro-1-(2-hydroxypropyl)-7-[2-(5-nitro-2-furyl)-vinyl]-4-oxo-1,8-naphthyridine-3-carboxylic acid.
G = 1-(3-chloro-2-hydroxypropyl)-1,4-dihydro-7-[2-(5-nitro-2-furyl)vinyl]-4-oxo-1,8-naphthyridine-3-carboxylic acid.

The antibacterial activities of the novel compounds of the present invention are little reduced in the presence of serum albumin, deoxychloric acid, liver homogenate, or kidney homogenate.

Further, the toxicity of the compounds of the present invention was tested as follows. When the compounds were administered orally as a suspension in 5% aqueous solution of acacia, all animals survived even in a dose of 1 g./kg. of the compounds.

A hemolytic action was tested by using the blood corpuscle of rabbits, but no hemolytic action was observed at a concentration of $10^{-6}$ g./ml. or $10^{-4}$ g./ml. of the compounds.

The novel compounds of the present invention can be prepared in accordance with the process represented by the following reaction schema:

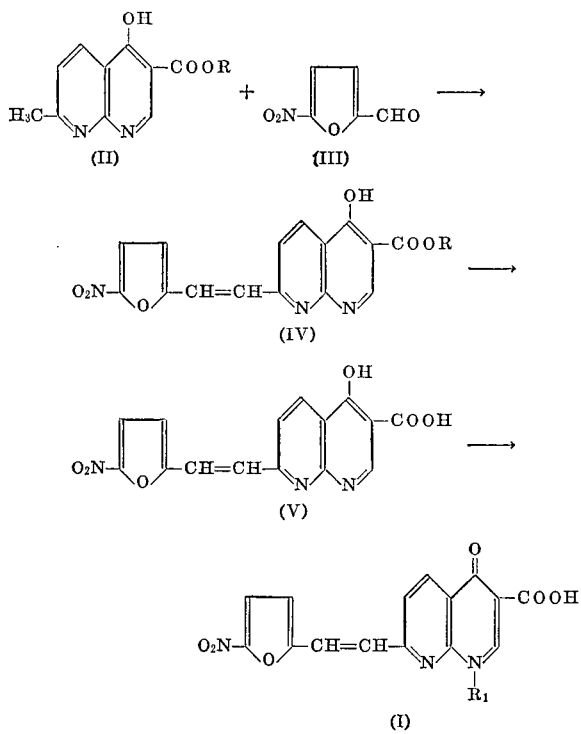

wherein R is a lower-alkyl radical and $R_1$ is the same as defined above.

In accordance with the above-described process, (I) is prepared by reacting lower-alkyl 4 - hydroxy - 7 - methyl - 1,8 - naphthyridine - 3 - carboxylate (II) with 5 - nitrofurfural (III) to produce lower-alkyl 4 - hydroxy 7 - [2 - (5 - nitro - 2 - furyl)vinyl] - 1,8 - naphthyridine 3 - carboxylate (IV), then hydrolyzing (IV) to produce 4 - hydroxy - 7 - [2 - (5 - nitro - 2 - furyl)vinyl] - 1,8 - naphthylridine - 3 carboxylic acid (V), and then intorducing a $R_1$ radical into the 1-nitrogen atom of the 1,8-naphthylridine-nucleus.

Lower-alkyl 4 - hydroxy - 7 - methyl - 1,8 - naphthyridine - 3 - carboxylate (II) employed as a starting material in this process can be readily prepared by reacting 2 - amino - 6 - methylpyridine with di-lower-alkyl ethoxymethylene-malonate to produce di-lower-alkyl N - (6-methyl - 2 - pyridyl)aminomethylene-malonte, followed by ring-closure of the product by heating in a suitable solvent in accordance with the process described by G. R. Lappin in Journal of the American Chemical Society, vol. 70, 3348 (1948).

The first step of this process is conveniently carried out by condensing (II) and (III) in the presence of a condensing agent such as sulfuric acid, hydrochloric acid, phosphoric acid, acetic anhydride, acetic acid, formic acid, zinc chloride, aluminum chloride, or a mixture thereof. When a liquid condensing agent is used, it can also serve as a solvent. The reaction temperature does not appear to be particularly critical, but it is preferable to carry out the reaction at a temperature between 50° and 160° C. Most suitably, the condensation is carried out by heating (II) and (III) at a temperature between 110° and 120° C. for several hours in a mixture of acetic anhydride and acetic acid.

The hydrolysis of the second step of this proces is conveniently carried out in the presence of a mineral acid such as hydrochloric acid, sulfuric acid phosphoric acid or perchloric acid.

Thus, (V) is prepared in a high yield by heating (IV) with the acid cited above at a temperature between 50° and 150° C. in a period of time ranging from one to 20 hrs. in a diluent such as water or a suitable aqueous solution of an organic solvent, e.g. acetic acid, dioxane, dimethylformamide, actonitrile, chloroform or a mixture thereof. Most suitably, the hydrolysis is carried out at a temperature between 100° and 110° C. in a mixture of acetic acid, hydrochloric acid and water.

Finally, (I) is obtained by introducing the $R_1$ radical into the 1-nitrogen atom of the 1,8-naphthyridine nucleus of (V) obtained above. Various procedures can be applied for introducing the $R_1$ radical depending upon the kind of the radical as follows.

The compound of the Formula I in which $R_1$ radical is a lower-alkyl radical; a radical represented by the following formula:

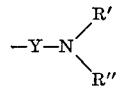

wherein R′, R″ and Y are the same as defined above; or a carboxy-lower-alkyl radical, can be prepared by reacting (V) in a suitable solvent with a compound represented by the following formula:

$$R_2X$$

wherein X is a halogen atom such as chlorine, bromine or iodine and $R_2$ is a lower-alkyl radical; a radical represented by the following formula:

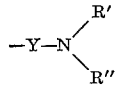

wherein R′, R″ and Y are the same as defined above; or a carboxy-lower-alkyl radical.

In the case the compound of the Formula I in which $R_1$ is a methyl radical or ethyl radical, however, the reaction may practically be carried out by reacting (V) with an ester of sulfuric acid such as dimethyl sulfate or diethyl sulfate.

In general, the reaction is conveniently carried out in the presence of a basic substance as an acid-acceptor such as sodium hydroxide, potassium hydroxide, potassium carbonate, sodium alcoholate or triethylamine. As the solvent, an aliphatic lower alcohol, e.g. methyl alcohol, ethyl alcohol or ethylene glycol; dioxane; dimethyl-formamide; dimethyl sulfoxide; acetonitrile or a mixture thereof can be used. The reaction is preferably carried out at a temperature ranging from room temperature to 150° C. for one to 20 hrs. Most suitably, the reaction is carried out at a temperature between 80° and 100° C. in dimethylformamide in the persence of potassium carbonate.

The compound of the Formula I in which $R_1$ is represented by the following radical:

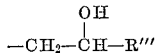

wherein R‴ is the same as defined above, is ordinarily prepared by reacting (V) with an epoxide repersented by the following formula:

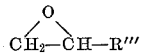

wherein R‴ is the same as defined above, in an organic solvent under normal or increased pressure for 10 to 50 hrs. at a temperature between room temperature and 150° C. As the organic solvent, dimethylformamide or dimethyl sulfoxide can be used.

Also within the scope of the present invention are salts of the above-described 1-substituted-1,4-dihydro-7-[2-(5-nitro-2-furyl)-vinyl]-4-oxo - 1,8 - naphthyridine-3-carboxylic acids. In the case the compound of the Formula I in which $R_1$ is a carboxy-lower-alkyl radical, it forms alkali metal salts on treatment with suitable alkali metal hydroxides, for example, sodium hydroxide or potassium hydroxide, while other compounds of the Formula I form acid-addition salts on treatment with suitable acids, for example, hydrochloric acid, sulfuric acid, nitric acid, phosphoric acid, methanesulfonic acid, cyclohexylsulfamic acid, oxalic acid, succinic acid and the like.

Although medicinally acceptable salts of said compounds are preferred, all alkali metal salts and all acid-addition salts are within the scope of the present invention. All salts are useful as sources of the free base or free acid form even if the particular salt per se is desired only as an intermediate product as for example when the salt is formed only for purposes of purification, or identification, or when it is used as an intermediate in preparing a medicinally acceptable salt by ion exchange procedures.

The following examples are given by way of illustration only and are not to be construed as limiting.

EXAMPLE 1

To a mixture of 20 ml. of acetic acid and 20 ml. of acetic anhydride were added 4.2 g. of ethyl 4-hydroxy-7-methyl-1,8-naphthyridine-3-carboxylate and 3.1 g. of 5-nitrofurfural, and the mixture was heated at a temperature between 110° and 120° C. for an hour. The starting materials were dissolved in 10–20 minutes and yellow crystals were separated. The crystals were collected by filtration while they were warm, washed with warm acetic acid and then with ether, and dried to give 5.0 g. (Yield: 77.8%) of ethyl 4-hydroxy-7-[2-(5-nitro-2-furyl)vinyl]-1,8-naphthyridine-3-carboxylate melting at above 280° C.

*Analysis.*—Calcd. for $C_{17}H_{13}N_3O_6$ (percent): C, 57.46; H, 3.69; N, 11.83. Found (percent): C, 56.98; H, 4.05; N, 11.71.

EXAMPLE 2

To a mixture of 20 ml. of acetic acid and 20 ml. of acetic anhydride were added 4.36 g. of methyl 4-hydroxy-7-methyl-1,8-naphthyridine-3-carboxylate and 3.1 g. of 5-nitrofurfural, and the mixture was heated at a temperature between 110° and 120° C. for 2 hrs. The separated crystals were collected by filtration while they were warm, washed successively with methanol and ether, and dried to give 5.2 g. (Yield: 76.4%) of yellow powder of methyl 4-hydroxy-7-[2-(5-nitro-2-furyl)vinyl] - 1,8 - naphthyridine-3-carboxylate melting at above 280° C.

*Analysis.*—Calcd. for $C_{16}H_{11}N_3O_6$ (percent): C, 56.31; H, 3.25; N, 12.31. Found (percent): C, 55.97; H, 3.52; N, 11.82.

EXAMPLE 3

To a mixture of 10 ml. of acetic acid and 10 ml. of acetic anhydride were added 5.2 g. of n-butyl 4-hydroxy-7-methyl-1,8-naphthyridine-3-carboxylate and 3.1 g. of 5-nitrofurfural, and the mixture was heated at a temperature between 110° and 120° C. for 2 hrs. The separated crystals were collected by filtration while they were warm, washed successively with acetic acid and ether, and recrystallized from dimethylformamide to give 5.8 g. (Yield: 76.0%) of yellow powder of n-butyl 4-hydroxy-7-[2-(5-nitro - 2 - furyl)vinyl]-1,8-naphthyridine-3-carboxylate melting at above 280° C.

*Analysis.*—Calcd. for $C_{19}H_{17}N_3O_6$ (percent): C, 59.53; H, 4.47; N, 10.96. Found (percent): C, 59.70; H, 4.70; N, 11.00.

EXAMPLE 4

To 40 ml. of acetic anhydride were added 2.32 g. of ethyl 4 - hydroxy-7-methyl-1,8-naphthyridine-3-carboxylate and 1.55 g. of 5-nitrofurfural, and the mixture was heated at a temperature between 130° and 140° C. for 2 hrs. After heating for 30 minutes the starting materials were dissolved, and after additional 1 hour the product began to separate. After the reaction was completed, the precipitates were collected by filtration, washed with ether, and dried to give 1.1 g. (Yield: 30%) of yellow powder of ethyl 4-hydroxy-7-[2-(5-nitro-2-furyl)vinyl]-1,8-naphthyridine-3-carboxylate melting at above 280° C.

EXAMPLE 5

To 20 ml. of acetic acid were added 2.32 g. of ethyl 4-hydroxy-7-methyl-1,8-naphthyridine - 3 - carboxylate and 1.55 g. of 5-nitrofurfural, and the mixture was heated at a temperature between 100° and 110° C. for 2 hrs. After heating for 30 minutes the starting materials were dissolved, and after additional 1 hour the product began to separate. After the reaction was completed, the precipitates were collected by filtration, washed with ether, and dried to give 2.6 g. (Yield: 73.2%) of yellow powder of ethyl 4-hydroxy-7-[2-(5-nitro-2-furyl)vinyl]-1,8-naphthyridine-3-carboxylate melting at above 280° C.

EXAMPLE 6

To a mixture of 10 ml. of acetic anhydride and 10 ml. of acetic acid were added 2.32 g. of ethyl 4-hydroxy-7-methyl-1,8-naphthyridine-3-carboxylate, 1.55 g. of 5-nitrofurfural and 100 mg. of zinc chloride, and the mixture was heated at 110°–120° C. for 2 hrs. After heating for 30 minutes the starting materials were dissolved, and after additional 1 hour the product began to separate. After the reaction was completed, the precipitates were collected by filtration, washed with ether, and dried to give 2.65 g. (Yield: 74.6%) of yellow powder of ethyl 4-hydroxy-7-[2-(5-nitro - 2 - furyl)vinyl]-1,8-naphthyridine-3-carboxylate melting at above 280° C.

EXAMPLE 7

A mixture of 2.32 g. of ethyl 4-hydroxy-7-methyl-1,8-naphthyridine-3-carboxylate, 3.1 g. of 5-nitrofurfural and 0.4 g. of zinc chloride was heated in a bath of a temperature between 150° and 160° C. for an hour. After cooling, 40 ml. of methanol was added thereto and warmed. The separated crystals were collected by filtration, washed successively with methanol and ether, and dried to give 2.9 g. of dark brown powder. The powder was washed with warm acetic acid, and recrystallized from dimethyl sulfoxide to give 2 g. (Yield: 56.3%) of yellowish brown powder of ethyl 4-hydroxy-7-[2-(5-nitro-2-furyl)-vinyl]-1,8-naphthyridine - 3 - carboxylate melting at about 280° C.

EXAMPLE 8

To 20 ml. of 98% formic acid were added 2.32 g. of ethyl 4-hydroxy-7-methyl-1,8-naphthyridine-3-carboxylate and 1.55 g. of 5-nitrofurfural, and the mixture was heated at 100°–110° C. with stirring for 3 hrs. The reaction mixture was allowed to stand overnight, and the separated crystals were collected by filtration, washed successively with methanol and ether, and dried to give 0.8 g. (Yield: 22.5%) of orange-yellow powder of ethyl 4-hydroxy-7-[2-(5 - nitro-2-furyl)vinyl]-1,8-naphthyridine-3-carboxylate melting at above 280° C.

EXAMPLE 9

To 10 ml. of acetic acid were added 1.16 g. of ethyl 4-hydroxy-7-methyl-1,8-naphthyridine-3-carboxylate and 1.34 g. of 5-nitrofurfural diacetate. There were added thereto 4 drops of conc. hydrochloric acid, and the mixture was heated at 120° C. with stirring for 3 hrs. The separated crystals were collected by filtration while they were warm, washed successively with methanol and ether, and dried to give 0.625 g. (Yield: 35%) of yellowish brown powder of ethyl 4-hydroxy-7-[2-(5-nitro-2-furyl)vinyl]-1,8-naphthyridine-3-carboxylate melting at above 280° C.

EXAMPLE 10

To a mixture of 3 ml. of conc. hydrochloric acid and 27 ml. of 90% acetic acid was added 1.8 g. of ethyl 4-hydroxy-7-[2-(5-nitro - 2 - furyl)vinyl]-1,8-naphthyridine-3-carboxylate, and the mixture was heated at 110° C. The starting materials were dissolved in 10 minutes and yellow crystals began to separate. After heating for an hour in all, the mixture was allowed to cool by standing. The separated crystals were collected by filtration, and recrystallized from dimethyl sulfoxide to give 1.30 g. (Yield: 79.3%) of 4-hydroxy-7-[2-(5-nitro-2-furyl)vinyl]-1,8-naphthyridine-3-carboxylic acid melting at above 280° C.

*Analysis.*—Calcd. for $C_{15}H_9N_3O_6$ (percent): C, 55.05; H, 2.77; N, 12.84. Found (percent): C, 54.50; H, 3.24; N, 12.98.

EXAMPLE 11

To a mixture of 6 ml. of conc. hydrochloric acid and 54 ml. of 90% acetic acid was added 3.4 g. of methyl 4-hydroxy-7-[2-(5-nitro-2-furyl)vinyl] - 1,8 - naphthyridine-3-carboxylate, and the mixture was heatetd in a bath of a temperature between 120° and 130° C. for 2 hrs. After cooling, the separated crystals were collected by filtration, and recrystallized from dimethylformamide to give 2.7 g. (Yield: 82.6%) of 4-hydroxy-7-[2-(5-nitro-2-furyl)vinyl]-1,8-naphthyridine-3-carboxylic acid melting at above 280° C.

EXAMPLE 12

To a mixture of 6 ml. of conc. hydrochloric acid and 54 ml. of 90% acetic acid was added 3.83 g. of n-butyl 4-hydroxy-7-[2-(5-nitro - 2 - furyl)vinyl]-1,8-naphthyridine-3-carboxylate, and the mixture was heated in a bath of a temperature between 120° and 130° C. for an hour. After cooling, the separated crystals were collected by filtration, and recrystallized from dimethylformamide to give 2.5 g. (Yield: 76.5%) of 4-hydroxy-7-[2-(5-nitro-2-furyl)vinyl]-1,8-naphthyridine-3-carboxylic acid melting at above 280° C.

EXAMPLE 13

To 20 ml. of acetic acid were added 2.32 g. of ethyl 4-hydroxy-7-methyl-1,8-naphthyridine-3-carboxylate and 1.55 g. of 5-nitrofurfural, and the mixture was heatetd at a temperature between 110° and 120° C. for 2 hrs. There was added thereto a mixture of 8 ml. of acetic acid, 2.6 ml. of conc. hydrochloric acid and 2.8 ml. of water, and the mixture was heated at 110° C. with stirring for additional 2 hrs. After cooling, the separated crystals were collected by filtration, washed successively with methanol and ether, and recrystallized from dimethylformamide to give 2.35 g. of yellow fine needles of 4-hydroxy7-[2-(5-nitro-2-furyl)vinyl] - 1,8-naphthyridine-3-carboxylic acid melting at above 280° C. Yield: 71.8% (calculated from ethyl 4-hydroxy-7-methyl-1,8-naphthyridine - 3 - carboxylate).

EXAMPLE 14

In 50 ml. of dimethylformamide was suspended 0.98 g. 4-hydroxy-7-[2-(5-nitro - 2 - furyl)vinyl]-1,8-naphthyridine-3-carboxylic acid. There were added thereto 0.83 g. of anhydrous potassium carbonate and 2.31 g. of diethyl sulfate, and the mixture was heated on a boiling water bath for 1.5 hrs. After the reaction was completed, the solvent was evaporated to dryness under reduced pressure. The residue was treated with water, and the undissolved material was centrifuged to give brownish black powder. The powder was dissolved in chloroform, passed through a column of silica gel (20 g.) and eluted with chloroform. The elute was evaporated to dryness, and recrystallized from glacial acetic acid to give 0.66 g. (Yield: 62%) of yellow prisms of 1-ethyl-1,4-dihydro-7-[2-(5 - nitro - 2 - furyl)vinyl]-4-oxo-1,8-naphthyridine-3-carboxylic acid decomposing at 280° C.

*Analysis.*—Calcd. for $C_{17}H_{13}N_3O_6$ (percent): C, 57.46; H, 3.69; N, 11.83. Found (percent): C, 57.44; H, 3.99; N. 11.64.

EXAMPLE 15

There was obtained 1-ethyl-1,4-dihydro-7-[2-(5-nitro-2-furyl)vinyl]-4-oxo-1,8-naphthyridine-3-carboxylic acid in a yield of 27% following the procedure described in Example 14 except that ethyl iodide was used in lieu of diethyl sulfate.

EXAMPLE 16

In 100 ml. of dimethylformamide was suspended 1.64 g. of 4-hydroxy-7-[2-(5-nitro-2-furyl)vinyl]-1,8-naphthyridine-3-carboxylic acid. There were added thereto 1.38 g. of anhydrous potassium carbonate and 3.15 g. of dimethyl sulfate, and the mixture was heated on a boiling water bath for 1.5 hrs. After the reaction was completed, the reaction mixture was cooled and the separated crystals were collected by filtration. The crystals were recrystallized from dimethylformamide to give 1.08 g. (Yield: 63%) of yellow needles of 1,4-dihydro-1-methyl-7-[2-(5-nitro-2-furyl)vinyl] - 4-oxo-1,8-naphthyridine-3-carboxylic acid melting at above 280° C.

*Analysis.*—Calcd. for $C_{16}H_{11}N_3O_6$ (percent): C, 56.31; H, 3.25; N, 12.31. Found (percent): C, 56.46; H, 3.31; N, 12.09.

EXAMPLE 17

In 100 ml. of dimethylformamide was suspended 1.64 g. of 4 - hydroxy - 7-[2-(5-nitro-2-furyl)vinyl]-1,8-naphthyridine-3-carboxylic acid. There were added thereto 1.38 g. of anhydrous potassium carbonate and 1 g. of n-propyl iodide, and the mixture was heated on a boiling water bath for 2 hrs. The reaction mixture was concentrated under reduced pressure and allowed to stand overnight. The separated crystals were collected by filtration, washed with water and recrystallized from dimethylformamide to give 1.2 g. (Yield: 65%) of yellow fine needles of 1,4-dihydro - 7 - [2-(5-nitro-2-furyl)vinyl]-4-oxo-1-n-propyl 1,8-naphthyridine-3-carboxylic acid decomposing at 277°–278° C.

Analysis.—Calcd. for $C_{18}H_{15}N_3O_6$ (percent): C, 58.53; H, 4.09; N, 11.38. Found (percent): C, 58.87; H, 4.32; N, 11.53.

EXAMPLE 18

In 100 ml. of dimethylformamide was suspended 1.64 g. of 4 - hydroxy - 7-[2-(5-nitro-2-furyl)vinyl]-1,8-naphthyridine-3-carboxylic acid. There were added thereto 1.38 g. of anhydrous potassium carbonate and 0.74 g. of iso propyl bromide, and the mixture was heated on a boiling water-bath for 2 hrs. The reaction mixture was concentrated under reduced pressure, and water was added thereto. The separated crystals were collected by filtration, and recrystallized from dimethylformamide to give 1.3 g. (Yield: 70.2%) of yellow fine needles of 1,4-dihydro-7-[2 - (5 - nitro - 2 - furyl)vinyl]-4-oxo-1-isopropyl-1,8-naphthyridine-3-carboxylic acid melting at above 280° C.

Analysis.—Calcd. for $C_{18}H_{15}N_3O_6$ (percent): C, 58.53; H, 4.09; N, 11.38. Found (percent): C, 58.90; H, 4.10; N, 11.41.

EXAMPLE 19

A mixture of 1.8 g. of 4-hydroxy-7-[2-(5-nitro-2-furyl)-vinyl]-1,8-naphthyridine-3-carboxylic acid, 4.5 g. of ethylene oxide and 48 ml. of dimethylformamide was heated at 80°–85° C. in a sealed tube for 16 hrs. After cooling, the separated crystals were collected by filtration, washed with ether, and recrystallized from dimethylformamide to give 1.2 g. (Yield: 60%) of yellow fine needles of 1,4 - dihydro - 1 - (2 - hydroxy-ethyl)-7-[2-(5-nitro - 2 - furyl)vinyl] - 4-oxo-1,8-naphthyridine-3-carboxylic acid decomposing at above 280° C.

Analysis.—Calcd. for $C_{17}H_{13}N_3O_7$ (percent): C, 54.99; H, 3.53; N, 11.32. Found (percent): C, 55.06; H, 3.45; N, 11.25.

EXAMPLE 20

A mixture of 3.3 g. of 4-hydroxy-7-[2-(5-nitro-2-furyl)-vinyl] - 1,8 - naphthyridine - 3 - carboxylic acid, 5.8 g. of propylene oxide and 50 ml. of dimethylformamide was heated at 85°–95° C. in a sealed tube for 16 hrs. After cooling, a small amount of undissolved material was removed by filtration. The filtrate was evaporated to dryness under reduced pressure, and the residue was washed with ether, whereupon 4.1 g. of deep yellow powder was obtained. The powder was recrystallized from a mixture of dimethylformamide and methanol to give 2.0 g. (Yield: 51.5%) of yellow fine needles of 1,4-dihydro-1-(2-hydroxypropyl) - 7 - [2 - (5 - nitro - 2 - furyl)vinyl]-4-oxo-1,8-naphthyridine-3-carboxylic acid decomposing at 254°–255° C.

Analysis.—Calcd. for $C_{18}H_{16}N_3O_7$ (percent): C, 56.10; H, 3.92; N, 10.91. Found (percent): C, 56.04; H, 4.05; N, 10.72.

EXAMPLE 21

In 33 ml. of dimethylformamide were added 1.64 g. of 4 - hydroxy - 7 - [2 - (5 - nitro - 2 - furyl)vinyl]-1,8-naphthyridine-3-carboxylic acid and 1.85 g. of glycidol, and the mixture was heated at 95° C. for 18 hrs. The reaction mixture was then evaporated to dryness under reduced pressure, and water was added thereto. The separated crystals were collected by filtration and recrystallized from a mixture of dimethylformamide and ethanol to give 1.05 g. (Yield: 52.5%) of yellow fine needles of 1,4 - dihydro - 1 - (2,3-dihydroxypropyl)-7-[2-(5-nitro- 2 - furyl)vinyl] 4 - oxo - 1,8-naphthyridine-3-carboxylic acid decomposing at 235°–240° C.

Analysis.—Calcd. for $C_{18}H_{15}N_3O_8 \cdot \frac{1}{2}H_2O$ (percent): C, 52.69; H, 3.93; N, 10.24. Found (percent): C, 52.56; H, 4.36; N, 9.88.

EXAMPLE 22

In 64 ml. of dimethylformamide were added 3.2 g. of 4 - hydroxy - 7 - [2 - (5 - nitro - 2 - furyl)vinyl] - 1,8-naphthyridine-3-carboxylic acid and 9.2 g. of epichlorohydrin, and the mixture was heated at 95° C. for 5 hrs. The reaction mixture was evaporated to dryness under reduced pressure, and water was added thereto. The separated crystals were collected by filtration, and extracted with warm acetone. The acetone extract was passed through a column of silica gel. The elute was evaporated to dryness under reduced pressure to give 2 g. (Yield: 47.7%) of yellow powder of 1-(3-chloro-2-hydroxypropyl)-1,4-dihydro - 7 - [2 -(5 -nitro-2-furyl)vinyl]-4-oxo-1,8-naphthyridine-3-carboxylic acid melting at above 280° C.

Analysis.—Calcd. for $C_{18}H_{14}N_3O_7Cl$ (percent): C, 51.50; H, 3.36; N, 10.01. Found (percent): C, 52.08; H, 3.64; N, 10.03.

EXAMPLE 23

In 30 ml. of dimethylformamide was suspended 1.63 g. of 4-hydroxy-7-[2-(5-nitro-2-furylvinyl]-1,8-naphthyridine-3-carboxylic acid. There were added thereto 1.4 g. of anhydrous potassium carbonate and 1 g. of monochloroacetic acid, and the mixture was heated at 80° C. for 10 hrs. The reaction mixture was concentrated under reduced pressure, and the separated crystals were collected by filtration, washed with water, and recrystallized from dimethyl sulfoxide to give 1 g. (Yield: 51.8%) of 1-carboxymethyl - 1,4 - dihydro - 7 - [2 - (5 - nitro-2-furyl) vinyl] - 4 - oxo - 1,8-naphthyridine-3-carboxylic acid melting at above 280° C.

Analysis.—Calcd. for $C_{17}H_{11}N_3O_8$ (percent): C, 53.00; H, 2.86; N, 10.92. Found (percent): C, 53.01; H, 3.00; N, 10.89.

There was added 409 mg. of thus prepared 1-carboxymethyl - 1,4 - dihydro - 7 - [2 - (5 - nitro-2-furyl)vinyl]-4-oxo-1,8-naphthyridine-3-carboxylic acid to a solution prepared by dissolving 69 mg. of potassium carbonate in 20 ml. of water. A small amount of undissolved material was removed by filtration, the filtrate was concentrated under reduced pressure at room temperature, the residue was added with 50 ml. of ethanol, and separated yellow precipitates were collected by filtration. The obtained precipitates were dissolved in 5 ml. of water, filtered, and the filtrate was added with ethanol, allowed to stand overnight. The separated yellow fine needles were collected by filtration, washed successively with ethanol and ether. The crystals were dried in the air, then dried at 100° C. under reduced pressure (20–30 mm. Hg) for 3 hrs. and further at 120°–130° C. under reduced pressure (1 mm. Hg) for 3 hrs. to give 350 mg. of monopotassium salt of 1-carboxymethyl-1,4-dihydro - 7 - [2 - (5 - nitro - 2-furyl) vinyl] - 4 - oxo - 1,8 - naphthyridine - 3 - carboxylic acid.

Analysis.—Calcd. for $C_{17}H_{10}N_3O_8 \cdot K \cdot 1.5H_2O$ (percent): C, 45.33; H, 2.90; N, 9.33; K, 8.68. Found (percent): C, 45.61; H, 3.10; N, 9.19; K, 8.75.

In 10 ml. of water was suspended 409 mg. of 1-carboxymethyl - 1,4 - dihydro-7-[2-(5-nitro-2-furyl)vinyl]-4-oxo- 1,8-naphthyridine-3-carboxylic acid. The pH of the suspension was adjusted to 9.4 with an aqueous potassium hydroxide solution. A small amount of undissolved material, if any, was removed by filtration, and 30 ml. of ethanol was added with stirring to the filtrate. The separated precipitates were collected by filtration, dissolved again in 10 ml. of water and filtered. 30 ml. of ethanol was added to the filtrate, and the separated precipitates were collected by filtration, washed successively with ethanol and ether and dried in the air. The precipitates were dried at 100° C. under reduced pressure (20–30 mm. Hg)

11 for 3 hrs., and further under reduced pressure (1 mm. Hg) at 130° C. for 3 hrs. to give 310 mg. of dipotassium salt of 1 - carboxymethyl - 1,4 - dihydro-7-[2-(5-nitro-2-furyl)vinyl]-4-oxo-1,8-naphthyridine-3-carboxylic acid.

*Analysis.*—Calcd. for $C_{17}H_{19}N_3O_8 \cdot K_2 \cdot 2.5H_2O$ (percent): C, 40.30; H, 2.79; N, 8.30; K, 15.44. Found (percent): C, 40.21; H, 3.13; N, 8.33; K, 15.15.

EXAMPLE 24

In 500 ml. of dimethylformamide was suspended 16.4 g. of 4-hydroxy-7-[2-(5-nitro-2-furyl)vinyl]-1,8-naphthyridine-3-carboxylic acid. There were added thereto 6.9 g. of anhydrous potassium carbonate and 17.2 g. of 2-diethylaminoethyl chloride hydrochloride, and the mixture was heated at 80° C. with stirring for 10 hrs. The reaction mixture was evaporated to dryness under reduced pressure, and 60 ml. of 4 N-hydrochloric acid was added thereto. The separated crystals were collected by filtration, washed with water and then with acetone, and recrystallized from dimethyl sulfoxide to give 20.5 g. (Yield: 89%) of yellow needles of 1-(2-diethylaminoethyl)-1,4-dihydro-7 - [2 - (5-nitro-2-furyl)vinyl]-4-oxo-1,8-naphthyridine-3-carboxylic acid hydrochloride decomposing at about 270° C. (changed to brown color).

*Analysis.*—Calcd. for $C_{21}H_{22}N_4O_6 \cdot HCl \cdot \frac{1}{2}H_2O$ (percent): C, 53.45; H, 5.13; N, 11.87. Found (percent): C, 53.25; H, 4.90; N, 11.78.

EXAMPLE 25

In 66 ml. of dimethylformamide was suspended 3.27 g. of 4 - hydroxy-7-[2-(5-nitro-2-furyl)vinyl]-1,8-naphthyridine-3-carboxylic acid. There were added thereto 3.3 g. of triethylamine and 2.88 g. of 2-dimethylaminoethyl chloride hydrochloride, and the mixture was heated at 80°–85° C. with stirring for 7 hrs. After the reaction was completed, 4 ml. of conc. hydrochloric acid was added thereto. After cooling, the separated crystals were collected by filtration, washed successively with water, methanol and ether, and recrystallized from dimethyl sulfoxide to give 3.17 g. (Yield: 72.9%) of yellow fine needles of 1,4-dihydro - 1 - (2-dimethylaminoethyl)-7-[2-(5-nitro-2-furyl) vinyl]-4-oxo-1,8-naphthyridine - 3 - carboxylic acid hydrochloride melting at above 280° C.

*Analyysis.*—Calcd. for $C_{19}H_{18}N_4O_6 \cdot HCl \cdot \frac{1}{2}H_2O$ (percent): C, 51.42; H, 4.54; N, 12.62. Found (percent): C, 51.22; H, 4.33; N, 12.21.

EXAMPLE 26

In 90 ml. of dimethylformamide was suspended 3 g. of 4 - hydroxy - 7 - [2-(5-nitro-2-furyl)vinyl]-1,8-naphthyridine-3-carboxylic acid. There were added thereto 1.28 g. of anhydrous potassium carbonate and 2.9 g. of 3-dimethylaminopropyl chloride hydrochloride, and the mixture was heated at 80° C. with stirring for 20 hrs. The reaction mixture was concentrated under reduced pressure, and the residue was added with 10% hydrochloric acid, centrifuged, and the precipitates were added with 10% hydrochloric acid, and taken to complete dryness under reduced pressure. The residue was washed with acetone, and recrystallized from dimethylformamide to give 2.1 g. (Yield: 50%) of yellow prisms of 1,4-dihydro-1-(3-dimethylaminopropyl) - 7-[2-(5-nitro-2-furyl)vinyl]-4-oxo-1,8-naphthyridine-3-carboxylic acid hydrochloride decomposing at 271°–273° C.

*Anaylsis.*—Calcd. for $C_{20}H_{20}N_4O_6 \cdot HCl \cdot \frac{1}{2}H_2O$ (percent): C, 52.46; H, 4.84; N, 12.24; Cl, 7.74. Found (percent): C, 52.69; H, 4.97; N, 11.88; Cl, 8.20.

EXAMPLE 27

In 164 ml. of dimethylformamide was suspended 16.4 g. of 4 - hydroxy-7-[2-(5-nitro-2-furyl)vinyl]1,8-naphthyridine-3-carboxylic acid. There were added thereto 12.2 g. of triethylamine and 10.3 g. of 2-diethylaminoethyl chloride hydrochloride, and the mixture was heated at 80°–85° C. with stirring for 1 hour. After cooling, 11 ml. of conc. hydrochloric acid was added thereto. After cooling, the separated crystals were colled by filtration, washed successively with water, acetone and ether, and recrystallized from dimethyl sulfoxide to give 20.1 g. (Yield: 85.2%) of yellow fine needles of 1-(2-diethylaminoethyl)-1,4 - dihydro - 7 - [2 - (5 - nitro-2-furyl)vinyl]-4-oxo-1,8-naphthyridine-3-carboxylic acid hydrochloride decomposing at about 270° C. (changed to brown color).

EXAMPLE 28

In 164 ml. of dimethylformamide were added 16.4 g. of 4-hydroxy-7-[2-(5-nitro-2-furyl)vinyl]-1,8-naphthyridine-3-carboxylic acid and 10.3 g. of 2-diethylaminoethyl chloride hydrochloride, and the mixture was heated in a bath of a temperature between 110° and 120° C. with stirring. There was added dropwise thereto over a period of 20 minutes a solution prepared by dissolving 9 g. of potassium carbonate in 37.5 ml. of ethylene glycol, and the mixture was further heated at the same temperature for 40 minutes. The reaction mixture was treated in the same way as in Example 27 to obtain 17.5 g. (Yield: 74%) of 1 - (2 - diethylaminoethyl)-1,4-dihydro-7-[2-(5-nitro - 2 - furyl)vinyl] - 4 - oxo-1,8-naphthyridine-3-carboxylic acid hydrochloride.

EXAMPLE 29

In 66 ml. of dimethylformamide was suspended 3.27 g. of 4-hydroxy-7-[2-(5-nitro-2-furyl)vinyl]-1,8-naphthyridine-3-carboxylic acid. There were added thereto 2.35 g. of anhydrous potassium carbonate and 3.44 g. of 2-diethylaminoethyl chloride hydrochloride, and the mixture was heated at 80°–85° C. with stirring for 5 hrs. After cooling, the separated crystals were collected by filtration, washed successively with water, acetone, and ether, and recrystallized from dimethyl sulfoxide to give 2.9 g. (Yield: 68%) of yellow needles of 1-(2-diethylaminoethyl) - 1,4 - dihydro-7-[2-(5-nitro-2-furyl)vinyl]-4-oxo-1,8-naphthyridine-3-carboxylic acid decomposing at 221°–222° C.

*Analysis.*—Calcd. for $C_{21}H_{22}N_4O_6$ (percent): C, 59.15; H, 4.80; N, 13.14. Found (percent): C, 58.91; H. 4.97; N, 12.93.

In a solution prepared by dissolving 4.26 g. of thus produced 1 - (2-diethylaminoethyl)-1,4-dihydro-7-[2-(5-nitro-2-furyl)vinyl] - 4 - oxo - 1,8 - naphthyridine-3-carboxylic acid in 520 ml. of warm acetone, a solution prepared by dissolving 1.06 g. of methanesulfonic acid in 10 ml. of warm acetone was added. Immediately precipitates were separated, and after cooling the precipitates were collected by filtration, and dried to give 5.06 g. (Yield: 96.7%) of yellow powder of methanesulfonate of 1-(2-diethylaminoethyl) - 1,4 - dihydro-7-[2-(5-nitro-2-furyl)vinyl]-4-oxo-1,8-naphthyridine-3-carboxylic acid decomposing at 264°–266° C.

*Analysis.*—Calcd. for $C_{21}H_{22}N_4O_6 \cdot CH_3SO_3H$ (percent): C, 50.57; H, 5.02; N, 10.72. Found (percent): C, 50.15; H, 5.05; N, 10.69.

In a solution prepared by dissolving 1.07 g. of 1-(2-diethylaminoethyl)-1,4-dihydro-7-[2 - (5 - nitro-2-furyl)-vinyl]-4-oxo-1,8-naphthyridine-3 - carboxylic acid in 110 ml. of warm acetone, there was added a solution of 0.49 g. of cyclohexylsulfamic acid in 10 ml. of acetone. The precipitates were immediately separated, collected by filtration, and dried to give 1.5 g. (Yield: 99.3%) of yellow needles of cyclohexylsulfamate of 1-(2 - diethylaminoethyl)-1,4-dihydro-7-[2-(5-nitro-2-furyl)vinyl] - 4 - oxo-1,8-naphthyridine - 3 - carboxylic acid decomposing at 227°–229° C.

*Analysis.*—Calcd. for $C_{21}H_{22}N_4O_6 \cdot C_6H_{13}NO_3S$ (percent): C, 53.54; H, 5.83; N, 11.56. Found (percent): C, 53.19; H, 5.91; N, 11.24.

EXAMPLE 30

To a solution prepared by dissolving 0.98 g. of 4-hydroxy-7-[2-(5-nitro-2-furyl)vinyl]-1,8 - naphthyridine-3- carboxylic acid in 30 ml. of hot dimethylformamide, there were added dropwise at 110°–120° C. over a period of 3 hrs. simultaneously a solution prepared by dissolving 1.33 g. of potassium carbonate in 8 ml. of ethylene glycol and a solution prepared by dissolving 1.72 g. of 2-ethylaminoethyl chloride hydrochloride in 15 ml. of dimethylformamide. The mixture was further heated at the same temperature with stirring for additional 2 hrs. The reaction mixture was added with 2 ml. of conc. hydrochloric acid, concentrated under reduced pressure, and poured into 50 ml. of water. The separated crystals were collected by centrifugation, washed sufficiently with water, and dried to give 1.04 g. (Yield: 80.0%) of yellowish brown powder. The powder was recrystallized from dimethylformamide to give yellow prisms of 1-(2-ethylaminoethyl)-1,4-dihydro-7-[2-(5-nitro-2 - furyl)vinyl] - 4 - oxo - 1,8-naphthyridine-3-carboxylic acid melting at above 280° C.

Analysis.—Calcd. for $C_{19}H_{18}N_4O_6 \cdot HCl$ (percent): C, 52.48; H, 4.40; N, 12.89. Found (percent): C, 52.37; H, 4.91; N, 12.52.

2-ethylaminoethyl chloride hydrochloride used as the starting material was prepared as follows:

A solution prepared by dissolving 17.8 g. of 2-ethylaminoethanol in 300 ml. of chloroform was cooled to —10° - —5° C. There was added dropwise thereto over a period of 3.5 hrs. 35.7 g. of thionyl chloride in 100 ml. of chloroform. The mixture was stirred at the same temperature for an hour, then refluxed gently for 2 hrs. Chloroform was distilled off, and the residue was allowed to cool. The separated crystals were collected by filtration, washed with a small amount of cold chloroform, and dried to give 26.1 g. (Yield: 90.6%) of colorless crystals. The crystals were recrystallized from a mixture of methanol, acetone, and ether to give colorless plates of 2-ethylaminoethyl chloride hydrochloride melting at 230°–232° C.

Analysis.—Calcd. for $C_4H_{11}Cl_2N$ (percent): C, 33.35; H, 7.70; N, 9.73; Cl, 49.23. Found (percent): C, 33.15; H, 7.35; N, 9.63; Cl, 48.84.

EXAMPLE 31

In 65 ml. of dimethylformamide was suspended 3.27 g. of 4-hydroxy-7-[2-(5-nitro-2-furyl)vinyl]-1,8 - naphthyridine-3-carboxylic acid. There were added thereto 6.24 g. of 3-diethylamino-2-methylpropyl chloride and 1.22 g. of triethylamine, and the mixture was heated at 80°–90° C. with stirring for 2 hrs. After cooling, 6 ml. of conc. hydrochloric acid was added thereto and cooled with ice. The separated crystals were collected by filtration, washed successively with water and methanol. The crystals were recrystallized from dimethylformamide to give 3.62 g. (Yield: 72%) of yellow crystalline powder of 1-(3-diethylamino-2-methylpropyl)-1,4-dihydro-7-[2 - (5 - nitro-2-furyl)vinyl]-4-oxo-1,8-naphthyridine-3-carboxylic acid hydrochloric decomposing at 248°–250° C.

Analysis.—Calcd. for $C_{23}H_{26}N_4O_6 \cdot HCl \cdot \frac{1}{2}H_2O$ (percent): C, 55.25; H, 5.64; N, 11.21. Found (percent): C, 55.01; H, 5.70; N, 11.09.

What is claimed is:
1. A compound of the formula:

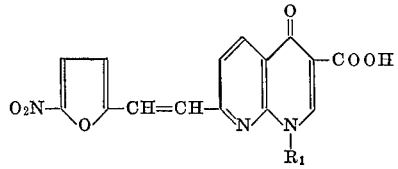

wherein $R_1$ is a member selected from the group consisting of a lower-alkyl radical; a radical represented by the following formula:

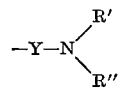

wherein $R'$ and $R''$ are the same or different and each is a member selected from the group consisting of a hydrogen atom and a lower-alkyl radical, and Y is a lower-alkylene group; a carboxy-lower-alkyl radical; and a radical of the formula:

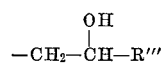

wherein $R'''$ is a member selected from the group consisting of a hydrogen atom, a lower-alkyl radical which can be substituted by a hydroxyl radical, and a lower alkyl radical substituted by a halogen atom.

2. The compound of claim 1 wherein $R_1$ is a lower-alkyl radical, 3. 1,4-dihydro - 1 - methyl - 7-[2-(5-nitro-2-furyl)-vinyl]-4-oxo-1,8-naphthyridine-3-carboxylic acid.

4. 1-ethyl - 1,4 - dihydro - 7-[2-(5-nitro-2-furyl)vinyl]-4-oxo-1,8-naphthyridine-3-carboxylic acid.

5. 1,4-dihydro - 7 - [2-(5-nitro-2-furyl)vinyl]-4-oxo-1-n-propyl-1,8-naphthyridine-3-carboxylic acid.

6. 1,4-dihydro-7-[2-(5-nitro - 2 - furyl)vinyl]-4-oxo-1-i-propyl-1,8-naphthyridine-3-carboxylic acid.

7. The compound of claim 1 wherein $R_1$ is a radical represented by the following formula:

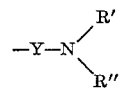

wherein $R'$ and $R''$ are the same or different and each represents a member selected from the group consisting of a hydrogen atom or a lower-alkyl radical, and Y represents a lower-alkylene group.

8. 1-(2 - diethylaminoethyl)-1,4-dihydro-7-[2-(5-nitro-2-furyl)vinyl]-4-oxo-1,8-naphthyridine-3-carboxylic acid.

9. 1-(2 - ethylaminoethyl)-1,4-dihydro-7-[2-(5-nitro-2-furyl)vinyl]-4-oxo-1,8-naphthyridine-3-carboxylic acid.

10. 1,4 - dihydro - 1 - (2 - dimethylaminoethyl) - 7 - [2 - (5 - nitro - 2 - furyl)vinyl] - 4 - oxo - 1,8 - naphthyridine - 3 - carboxylic acid.

11. 1,4 - dihydro - 1 - (3 - dimethylamino - n - propyl)-7 - [2 - (5 - nitro - 2 - furyl)vinyl] - 4 - oxo - 1,8 - naphthyridine-3-carboxylic acid.

12. 1 - (3 - diethylamino - 2 - methylpropyl) - 1,4-dihydro - 7 - [2 - (5 - nitro - 2 - furyl)vinyl] - 4 - oxo - 1,8 - naphthyridine - 3 - carboxylic acid.

13. The compound of claim 1 where $R_1$ is a carboxy-lower-alkyl radical.

14. 1 - carboxymethyl - 1,4 - dihydro - 7 - [2 - (5-nitro-2 - furyl)vinyl] - 4 - oxo - 1,8 - naphthyridine - 3 - carboxylic acid.

15. 1 - (1 - carboxyethyl) - 1,4 - dihydro - 7 - [2-(5-nitro - 2 - furyl)vinyl] - 4 - oxo - 1,8 - naphthyridine-3-carboxylic acid.

16. The compound of claim 1 wherein $R_1$ is a radical of the formula:

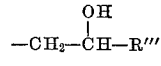

wherein $R'''$ is a member selected from the group consisting of a hydrogen atom, a lower - alkyl radical which can be substituted by a hydroxyl radical, and a lower-alkyl radical substituted by a halogen atom.

17. 1,4 - dihydro - 1 - (2 - hydroxyethyl) - 7 - [2-(5-nitro - 2 - furyl)vinyl] - 4 - oxo - 1,8 - naphthyridine-3-carboxylic acid.

18. 1,4 - dihydro - 1 - (2 - hydroxypropyl) - 7 - [2-(5-nitro - 2 - furyl)vinyl] - 4 oxo - 1,8 - naphthyridine - 3-carboxylic acid.

19. 1 - (3 - chloro - 2 - hydroxypropyl) - 1,4 - dihydro-7-[2 - (5 - nitro - 2 - furyl)vinyl] - 4 - oxo-1,8-naphthyridine - 3 - carboxylic acid.

20. 1,4 - dihydro - 1 - (2,3 - dihydroxypropyl) - 7-[2 - (5 - nitro - 2 - furyl)vinyl] - 4 - oxo - 1,8 - naphthyridine - 3 - carboxylic acid.

21. A compound of the formula:

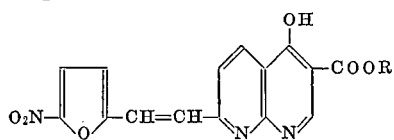

wherein R is a loweralkyl radical.

22. Ethyl 4 - hydroxy - 7 - [2 - (5 - nitro - 2 - furyl)-vinyl] - 1,8 - naphthyridine - 3 - carboxylate.

23. Methyl 4 - hydroxy - 7 - [2 - (5 - nitro - 2 - furyl)-vinyl] - 1,8 - naphthyridine - 3 - carboxylate.

24. Butyl 4 - hydroxy - 7 - [2 - (5 - nitro - 2 - furyl)-vinyl] - 1,8 - naphthyridine-3-carboxylate.

25. 4 - hydroxy - 7 - [2 - (5 - nitro - 2 - furyl)vinyl]-1,8 - naphthyridine-3-carboxylic acid.

References Cited

UNITED STATES PATENTS 3,149,104   9/1964   Lesher et al. _____ 260—240

OTHER REFERENCES

Miura et al., Yakugaku Zasshi, vol. 83, pages 771 to 777 (1963).

Miura et al. II, Progress in Medicinal Chemistry, vol. 5, chapter 6, pages 320 to 322 and 330 to 333 (1967).

JOHN D. RANDOLPH, Primary Examiner

U.S. Cl. X.R.

260—295.5, 296; 424—263